Dec. 13, 1932.  A. F. PHELPS  1,890,825
LOCOMOTIVE JOURNAL BOX
Filed April 28, 1931
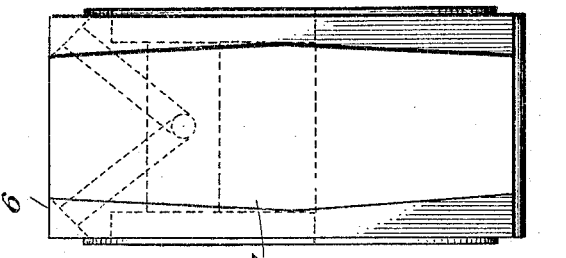
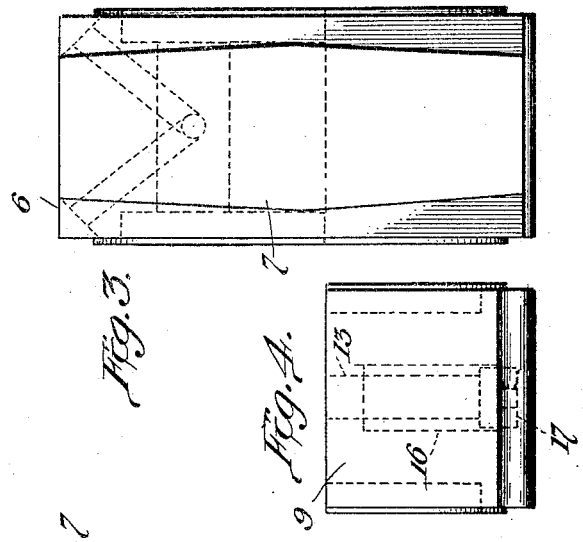
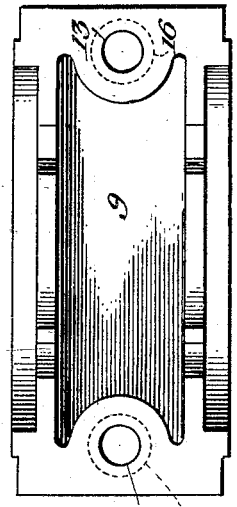
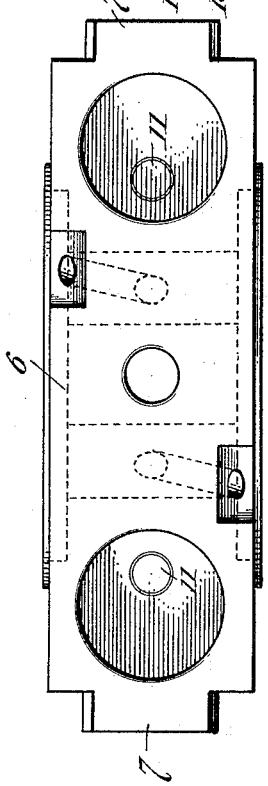
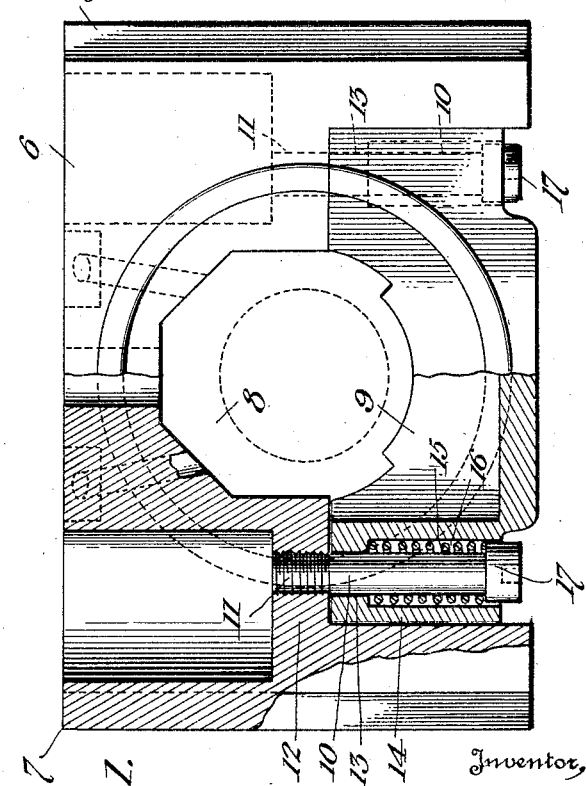
Inventor,
Arthur F. Phelps.

Patented Dec. 13, 1932

1,890,825

UNITED STATES PATENT OFFICE

ARTHUR FRED PHELPS, OF BLUEFIELD, WEST VIRGINIA, ASSIGNOR TO WEST VIRGINIA ARMATURE CO., OF BLUEFIELD, WEST VIRGINIA

LOCOMOTIVE JOURNAL BOX

Application filed April 28, 1931. Serial No. 533,533.

The present invention relates to journal bearings for axles of car wheels and consists in the combinations and arrangements of elements hereinafter described and particularly set forth in the accompanying claim.

The purpose of the invention is to provide a journal bearing especially adapted for axles of locomotive car wheels of the type employed in working mines, which is flexible and will yield when put to extreme usage as when the locomotive becomes derailed through uneven or spread tracks, or from other cause. And in these emergencies the parts of the bearing will be automatically restored to their original or normal positions.

Summarily stated, the improved journal bearing is characterized in having an upper fixed and a lower yieldable bearing block member engaging the car wheel axle and normally held in bearing engagement through resilient means permitting separation of the bearing parts a sufficient distance to allow for undue stress to which the axle is subjected and which bearing parts will be automatically restored after said strains are relieved. The journal bearing is further designed with regard to simplicity of construction and ruggedness to the end of withstanding all ordinary kinds of mining use or abuse and which will stand up or give effective service until completely worn out. The purpose is to provide a yielding, strain-resisting, flexible, and unbreakable journal box.

The construction disclosed herein shows one adaptation of the underlying principle of the invention and further modifications or adaptations thereof are disclosed in my four (4) co-pending applications for U. S. Letters Patents on "Locomotive journal boxes" executed and filed of even date, to wit: Serial Nos. 533,532 to 533,535, inclusive.

Outside frame carriages for mining cars of this type do not require flexibility of construction to prevent breakage in their journal boxes or yielding in the lower halves thereof, because, being located at the ends of the axle and outside the track gauge, the degree of angular displacement is so slight under any circumstances compared with the vertical stroke of the journal box in its guides that there is little or no likelihood of any breakage occurring. Furthermore, outside frame journal boxes are commonly solid castings and become rarely broken, while inside frame journal boxes—as herein shown—must be of split or divided type for the purpose of readily assembling on the axles between the driving wheels. In this position the radius of variation in height between the two boxes on the same axle is very short, and, since the normal movements of the journal box in its guides is vertical and never angular or rotary, beyond very slight limits, this variation sometimes reaches a great angle and tends to spread the top and bottom halves apart, throwing great strain on the clamped halves of the box, which are commonly held together by machine bolts, screws, or lock-pins. Frequently through such stresses the bolts become broken, pins are sheared, or the box is strained completely out of shape. The invention disclosed herein proposes to overcome these disadvantages and to supply a wide felt need for a journal box for inside frame locomotives which will be proof against these injuries.

The invention is shown by way of illustration in the accompanying drawing, wherein;

Figure 1 is a central sectional view, partly in elevation, of the locomotive journal box.

Figure 2 is a top plan view thereof.

Figure 3 an end elevation.

Figure 4 an end elevational view of the lower or movable bearing block, and;

Figure 5 is a top plan view thereof.

Referring to the construction in further detail, and wherein like reference characters designate corresponding parts in the different figures, the journal box comprises a suitable frame or supporting structure 6 having side portions 7 for mounting in the wheel truck or carriage of the car, and having an upper recess, and a larger lower recess designed to receive the usual upper fixed and lower movable axle bearing blocks 8 and 9, respectively, as shown. Said lower recess is of rectangular cross section and provides squared or plane frictional bearing surfaces.

The lower bearing block 9 is designed to have limited vertical movement within the space of the lower recess of the support or frame 6 and is also adapted to have restricted angular or rotary-like movements to take up corresponding motions of the axle of the locomotive through derailment or other probable cause to which cars employed in mines are constantly subjected. In such emergencies the invention operates to allow for such extreme usage of the car axle and operates to restore the movable journal part to normal position. The engaging squared surfaces of the support and the lower or movable block gives the requisite strength to the journal bearing.

The means supporting the lower bearing block consists of two bolts 10 having threaded portions 11 screwed into the shoulders 12 formed in the side portions of the frame 6, as shown. Said bolts are adapted to be conveniently secured in position when placing the bearing block 9 and as conveniently removed from position when said bearing block is withdrawn, as will be understood.

The two bolts 10 freely pass through apertures 13 formed in the two side portions 14 of the block 9, and the dimensions of said side portion 14 permit free up and down movements, and also allow limited lateral or rotary-like motion to the block 9 when the wheel axle is subjected to undue strain from the causes stated.

The resilient sustaining means for said bearing block consists of a spring member 15 mounted on each of the bolts 10 within the chamber 16 thereof, and at its lower end said spring engages the head 17 of the bolt, which head is of such dimensions that it moves freely into and out of the space or recess 16.

It will be understood the journal box herein disclosed is provided with all other essential devices for mounting the same in position on the truck or corresponding portion of the locomotive, and is likewise equipped for supplying lubricant to the wheel axle bearing in the two blocks 8 and 9, and with the details of which construction the present invention is not concerned.

It will be further understood that those skilled in the art may vary the details of construction and arrangement of parts without departing from the spirit of my invention; and therefore I do not wish to be limited to such features except as required by the claim.

What is claimed as new is:

A journal box for railway car axles comprising a suitable support having an upper recess and a relatively larger under recess therein of rectangular cross section forming squared friction bearing surfaces, an upper axle bearing block fixedly mounted in said upper recess, a lower axle bearing block movably mounted in said under recess, said lower block having squared bearing surfaces fitting closely adjacent the complementary squared bearing surfaces formed in said under recess, depending bolts having fixed screw threaded engagement with the support freely passing through apertures in said lower block, cylindrical shaped openings extending entirely through the lower bearing block continuous with and larger than said bolt apertures, said fixed bolts having heads closely fitting within the lower ends of said large openings, and springs fitting wholly within said large openings on said bolts and resiliently mounting the lower block on said bolt heads, said springs and bolts operable to permit of limited angular movements of said lower block and restoring to normal position thereof, substantially as set forth.

In testimony whereof I affix my signature.

ARTHUR F. PHELPS.